Patented Apr. 21, 1936

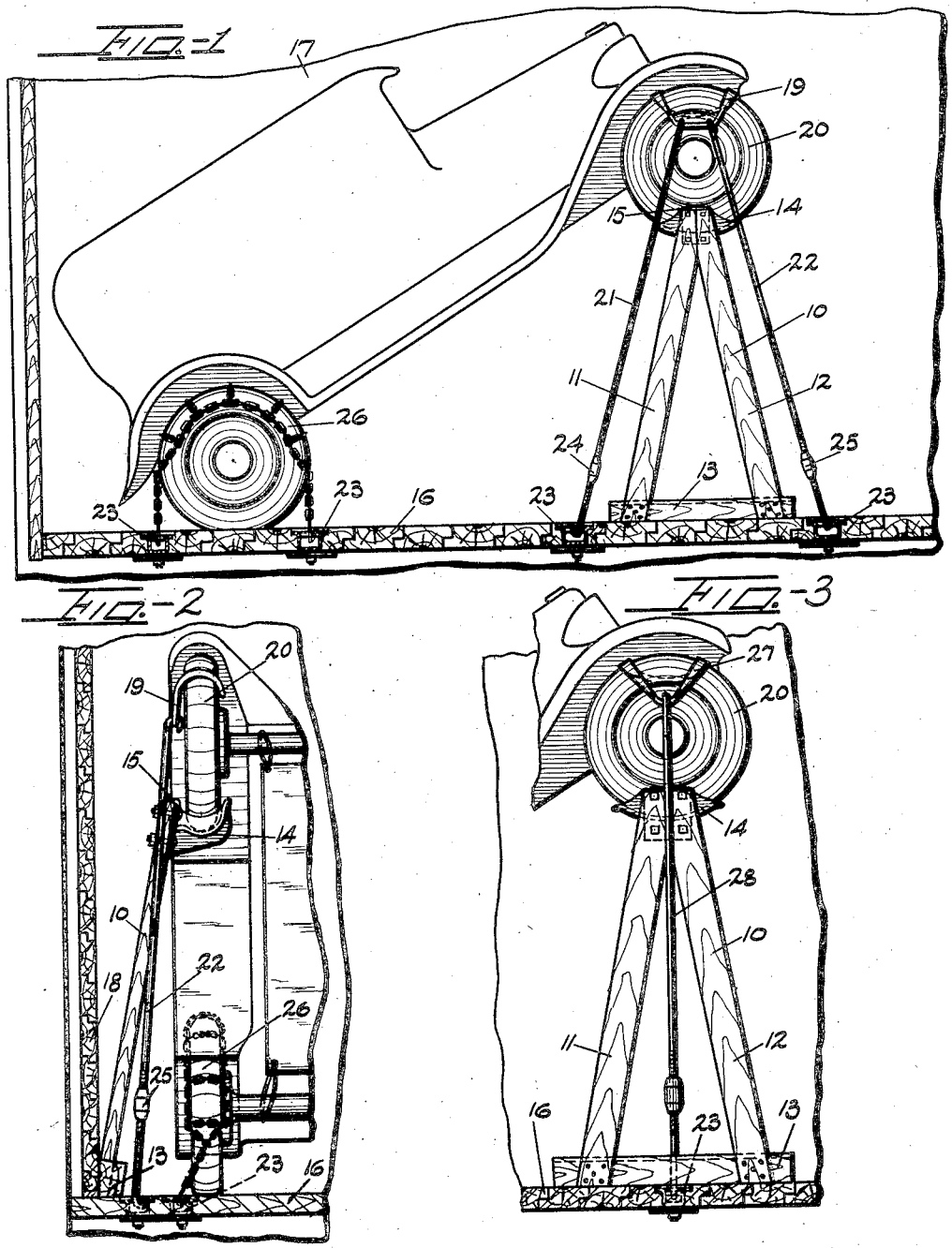

2,038,014

UNITED STATES PATENT OFFICE 2,038,014

MEANS FOR TRANSPORTING AUTOMOBILES

Kenneth J. Tobin, Chicago, Ill., assignor, by mesne assignments, to Evans Products Company, Detroit, Mich., a corporation of Delaware Application February 20, 1932, Serial No. 594,202

2 Claims. (Cl. 105—368)

This invention relates to means for maintaining automobiles in inclined or half-decked position in railway freight cars in which they may be transported and concerns itself more particularly with such means applicable to one end of an automobile to position said end in spaced relation to the floor of the freight car.

It is an object of this invention to provide means engageable with wheels at one end of an automobile to support said end in spaced relation to the floor of a freight car in which said automobile may be transported, said means embodying a frame supported upon the floor of the car but which is not required to be nailed to said floor.

A further object is to provide means engageable with the wheels of one end of an automobile to support said end in spaced relation to the floor of the vehicle in which said automobile is being transported, said means comprising a strut extending from each of said wheels to said floor and devices engaging said wheels for maintaining the struts in position whereby the use of nails to secure said struts to the floor is avoided.

With the foregoing objects in view, as well as those which will become more apparent as the description of the invention proceeds, this invention comprises the novel structure and combination of parts hereinafter described and more particularly pointed out and defined in the appended claims.

In the drawing

Figure 1 is a fragmentary elevation showing the invention in its application to one end of an automobile.

Figure 2 is a partial end view of an automobile looking toward the left as viewed in Figure 1.

Figure 3 is a partial view similar to Figure 1, showing a modified form of the invention.

In order to position the greatest number of automobiles in a vehicle such as a railway freight car for transportation therein the shipper customarily resorts to the expedient of placing some of the automobiles in said vehicle in inclined or half-decked position. In this position the wheels at one end of the automobile, usually the rear end, rest upon the floor of the vehicle while the wheels at the opposite end of the automobile are positioned and maintained in spaced relation to the floor. Various means have been proposed for supporting the spaced end of the automobile in proper position during transportation thereof in the freight car. Such means utilizes a member resting upon the floor and extending into engagement with the spaced end of the automobile to support said end. To maintain this member in its proper position upon the floor it is the usual practice to drive nails or spikes through the member into the floor of the car, resulting in rapid deterioration of said floor and the consequent necessity for frequent replacement thereof. The structural embodiment of the instant invention is such as to avoid the use of nails or spikes and the consequent preservation of the floor.

In the preferred embodiment of this invention there is employed a frame or strut 10 of substantially inverted V shaped construction. The strut comprises the diverging legs 11 and 12, to the divergent ends of which a brace 13 is secured. The contacting portions of the legs 11 and 12 carry a wheel receiving member 14 bolted or otherwise secured to the strut and provided with a flange 15 which overlies the edge of the strut adjacent the end to which said wheel receiving member is secured. It is apparent that this flange, when pressure is applied to the wheel receiving member 14, will be effective to relieve the securing bolts of some of the strain applied thereto. While the frame or strut 10, illustrated and described, is of substantially inverted V shaped construction it is to be understood that the invention is not limited to the particular construction of the strut disclosed. The frame or strut 10, in its operative position, rests upon the floor 16 of the carrier vehicle 17 with the brace 13 in engagement with the floor. The opposite end of the strut 10 is adapted to extend upwardly and inwardly from the floor and to position one end of an automobile in spaced relation thereto by the engagement of a wheel at the elevated or spaced end of said automobile. As clearly shown in Figure 2 of the drawing the lower end of the strut preferably rests upon the floor 16 in the angle formed between said floor and a wall 18 of the vehicle.

In order to maintain engagement between each wheel at the spaced end of the automobile and its corresponding strut and to avoid the use of nails or spikes driven into said strut and into the floor of the car in maintaining this relationship, there is utilized a substantially hook-shaped member 19 engaged with each of the wheels 20 at the spaced end of the automobile. A plurality of bars 21—22 are attached to said hook-shaped members 19 and extend from said members to the floor of the vehicle where they have hooked engagement with a plurality of anchoring devices 23 secured to said floor. Turnbuckles 24—25 may be employed in order to place said bars under tension. It may be noted that the rear wheels 26 of the automobile are maintained in engagement with the floor of the vehicle 17 by means of a chain embracing said wheels and extending into engagement with a plurality of the anchoring devices 23.

Figure 3 of the drawing illustrates a modification of the structure utilized to maintain one end of the automobile in spaced relation to the floor of the freight car. As in the previous embodiment described a frame or strut 10 is utilized, having a wheel receiving member 14 for receiving a wheel 20 at the spaced end of the automobile. A hook-shaped member 27 is, however, utilized in this embodiment of the invention and a single bar 28 having hooked engagement with said member 27 extends therefrom to an anchoring device 23 to which it is secured. It is apparent from the modified form of the invention that a single bar may be employed rather than the two bars heretofore disclosed.

In the application of the means of the instant invention to an automobile for supporting one end thereof in spaced relationship to the floor of the vehicle in which said automobile is being transported the desired end of the automobile is first elevated and the brace or strut 10 positioned for each wheel at said end so that a wheel will rest upon the wheel receiving member secured to each strut. As heretofore noted the lower end of each strut will lie preferably in the angle provided by the walls and the floor of the freight car. The hooked members 19 are then applied to the wheels and the bars 21—22 engaged with said hooked members and with anchoring devices 23 secured to the floor. By operation of turnbuckles 24—25 the bars 21—22 are tensioned so that a compressive force is exerted upon the struts or braces 10. In view of this fact, the struts or braces 10 are firmly maintained upon the floor of a railway car and it is not necessary to drive nails or spikes through said struts into the floor of the car to secure the struts thereto. While turnbuckles have been illustrated and described for the purpose of placing the struts under compression, it is clear that other means may, if desired, be employed to obtain this end. If desired the wheels may be deflated before the application of the hooked members 19 and the bars 21 and 22 so that hooked engagement between the lower ends of said bars and the anchoring devices 23 may be effected. Upon subsequent inflation of said wheels it is apparent that the bars 21 and 22 will be tensioned and that a resultant compressive force will be applied to the struts.

The terms "wheels" used herein is intended to include the tires employed with automobile wheels.

It is apparent that numerous changes and modifications in the details of the invention will occur to those skilled in the art. It is intended, therefore, that all such changes and modifications be comprehended within this invention, which is to be limited only by the scope of the claims appended hereto.

I claim:

1. In a transportation vehicle, in combination, an automobile, struts adapted to engage and support one end of said automobile in elevated position above the floor of said vehicle, each of said struts having a base portion freely supported upon said floor whereby said struts are capable of movement longitudinally and transversely of said vehicle upon said floor, wheel receiving members carried by said struts having peripheral supporting engagement with the wheels at said elevated end of said automobile and means for maintaining said struts substantially immovable upon said floor and for preventing longitudinal movement of said automobile, comprising hook shaped members including arms straddling spaced portions of said wheels and tension devices connected to said hook shaped members and to said floor whereby the use of nails or the like for fastening said struts to said vehicle is avoided.

2. In a transportation vehicle, a floor presenting an unobstructed upper surface and having a plurality of anchoring devices in combination with an automobile disposed for shipment in said vehicle with one end of said automobile elevated above said floor, a plurality of struts, each of said struts having a wheel receiving member peripherally engaging a wheel at said elevated end of said automobile and a base portion freely supported upon said floor whereby said struts are capable of movement longitudinally and transversely of said vehicle upon said floor and means for maintaining said struts substantially immovable upon said floor and for preventing longitudinal movement of said automobile, comprising hook shaped members including arms straddling spaced portions of the upper periphery of said wheels and tension devices connected to said hook shaped members and to said floor, whereby the use of nails or the like for fastening said struts to said vehicle is avoided.

KENNETH J. TOBIN.